United States Patent [19]

Weilbacher et al.

[11] 4,036,686
[45] July 19, 1977

[54] APPARATUS FOR EXAMINING THE FUEL RODS OF A NUCLEAR REACTOR

[75] Inventors: Jean-Claude Weilbacher, L'Isle Adam; Guy Bodson, Neuilly-sur-Seine, both of France

[73] Assignee: Societe Franco-Americaine de Constructions Atomiques-Framatome, Courbevoie; Bodson S.A., Nanterre, both of France

[21] Appl. No.: 647,167

[22] Filed: Jan. 7, 1976

[30] Foreign Application Priority Data

Jan. 22, 1975   France ............................. 75.01924

[51] Int. Cl.² ........................................... G21C 17/08
[52] U.S. Cl. ................................... 176/19 R; 176/30
[58] Field of Search .............. 176/19 R, 30; 356/237, 241; 350/308

[56] References Cited

U.S. PATENT DOCUMENTS

| | | | |
|---|---|---|---|
| 2,852,979 | 9/1958 | Hund | 350/308 |
| 3,098,811 | 7/1963 | Guidi | 176/30 |
| 3,173,844 | 3/1965 | Jones | 176/30 |
| 3,265,584 | 8/1966 | Cooper | 176/19 R |
| 3,511,091 | 5/1970 | Thome | 176/19 R |
| 3,561,432 | 2/1971 | Yamaki et al. | 356/241 |
| 3,664,922 | 5/1972 | Diwinsky et al. | 176/30 |
| 3,737,372 | 6/1973 | Debergh et al. | 176/19 R |

FOREIGN PATENT DOCUMENTS

895,893   5/1962   United Kingdom .............. 176/19 R

OTHER PUBLICATIONS

Nuclear Science Abstracts, vol. 22 (8168) No. 33582 p. 3422.
Transactions of the American Nuclear Society, vol. 8, (4/11/65) pp. 582–584.

*Primary Examiner*—Samuel W. Engle
*Assistant Examiner*—S. A. Cangialosi

[57] ABSTRACT

Apparatus for visually examining the fuel rods of an assembly of fuel rods immersed in the tank of a nuclear reactor or in a deactivation tank, comprises an endoscope including a prism and an optical system of stabilized glass, and at least one arm supporting a mirror facing the prism and inclined relative to the plane defined by the axis of the tube of the endoscope and the arm, the thickness of the arm-mirror assembly being less than the free space between the rods of the assembly. In use the apparatus is mounted on a system of carriages which enable the apparatus to move in three perpendicular directions, the carriages being associated with rotatable means for supporting an assembly of rods to be examined.

7 Claims, 4 Drawing Figures

APPARATUS FOR EXAMINING THE FUEL RODS OF A NUCLEAR REACTOR

The present invention relates to the examination of the rods in the fuel assembly of a nuclear reactor.

In such a reactor, the fuel is contained in metal tubes or rods and these rods are arranged in parallel and assembled in groups, generally of square section. These groups, constituting the fuel assembly, are disposed at the heart of the reactor. The rods have a diameter of the order of 1 cm and are regularly spaced apart by a distance of 2 to 3 mm, for example.

Periodically, in the course of the use of such a charge of fuel, it is necessary to check the assemblies for deformation of the tubes containing the fuel. Moreover, it is an advantage to be able to check the diameter of the rods to discover in good time any that are at risk of cracking.

During the life of the fuel charge, these examinations have to be effected on site in the reactor tank, and at the end of use in a deactivation tank.

The means used at present only enable the peripheral rods of a fuel assembly to be observed, and, even for these peripheral rods, do not allow the portions turned towards the inside of the assembly to be observed. In fact, conventional nuclear endoscopes with metal mirrors and an optical system of stabilized glass have too large a diameter to be able to be introduced between the rods of an assembly. While medical endoscopes have a sufficiently small diameter to permit their introduction between the rods, the optical fibres ensuring their illumination have only a limited life under radiation of nuclear origin, which renders their use difficult, or even impossible under these conditions.

The present invention provides a solution to these problems, by an apparatus and an installation permitting the continuous visual examination of the surface state of the rods of a fuel assembly immersed in the reactor tank or in a deactivation tank. Moreover, this device permits the measurement step by step or continuously of the variations in diameter of the fuel rods and of any deformation in the assembly.

According to one aspect of the invention, there is provided apparatus for examining fuel rods and adapted to permit the visual examination of the rods of a fuel assembly immersed in the tank of a nuclear reactor or in a deactivation tank, the apparatus comprising an endoscope of relatively large diameter provided with a prism and an optical system of stabilized glass, and at least one arm supporting at least one mirror facing the prism and inclined relative to the plane defined by the axes of the tube of said endoscope and of said arm, the thickness of the arm-mirror assembly being less than the free space between the rods in the assembly to be examined.

According to another aspect of the invention, there is provided an installation for use in examining the fuel rods in an assembly of fuel rods comprising:

a. an examination station adapted to be submerged and comprising:

a rotatable receptacle for receiving a vertical assembly of rods to be examined, three movable carriages and respective means for moving said carriages, a first one of said carriages being movable on slides parallel to the rods of an assembly resting on the receptacle, a second one of said carriages being movable on horizontal slides carried by said first carriage, and a third one of said carriages being movable horizontally in a direction perpendicular to the direction of movement of said second carriage; and apparatus as above defined carried by said third carriage:

b. a service station adapted to be situated on an external platform and comprising:

a remote-control assembly for controlling movement of said three carriages and rotation of said receptacle; and a station for observing images transmitted by said endoscope.

In a preferred embodiment of the installation, the endoscope is coupled to a television camera carried by said third carriage, said camera being connected by cable to a visual receiver and a magnetoscope disposed at said service station.

The apparatus may include profilometric pincers having two arms forming a sensor for the external diameter of the rods and/or the spacing between rods, and means for sensing the angular position of the two arms of the pincers. In this case, the installation comprises an assembly for registering the signals of the sensing means of the profilometric pincers.

The invention will be more fully understood from the following description of an embodiment thereof, given by way of example only, with reference to the accompanying drawings.

Figure 1:
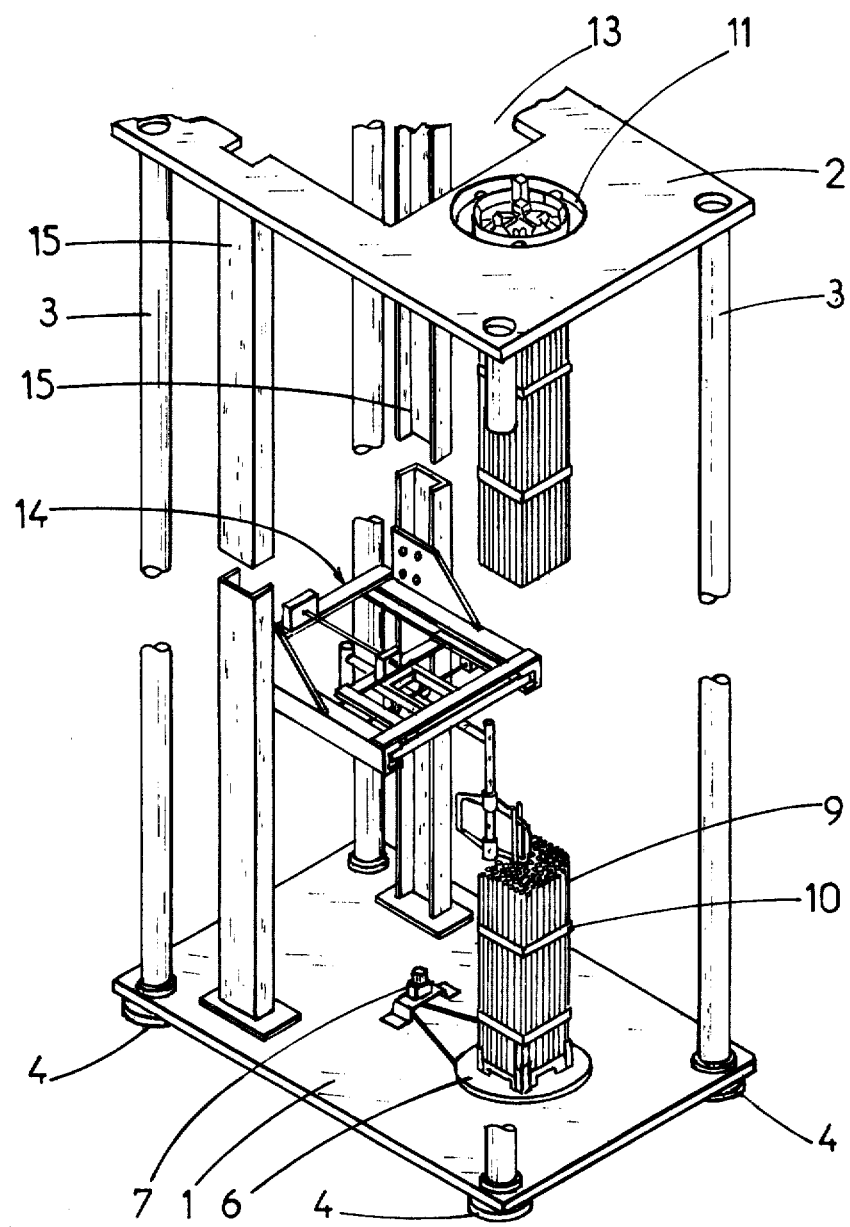
FIG. 1 is a simplified general perspective view of part of an installation according to the present invention submerged in a reactor tank or in a deactivation tank.

Referring to FIG. 1, it will be noted that the submerged part of the installation comprises a supporting table consisting of a lower plate 1 and an upper plate 2, connected by distance-pieces 3. The regulation of the verticality of the supporting table in the tank is ensured by a system of jacks 4 controlled from a service platform situated outside the tank and not illustrated in the Figure.

Figure 3:
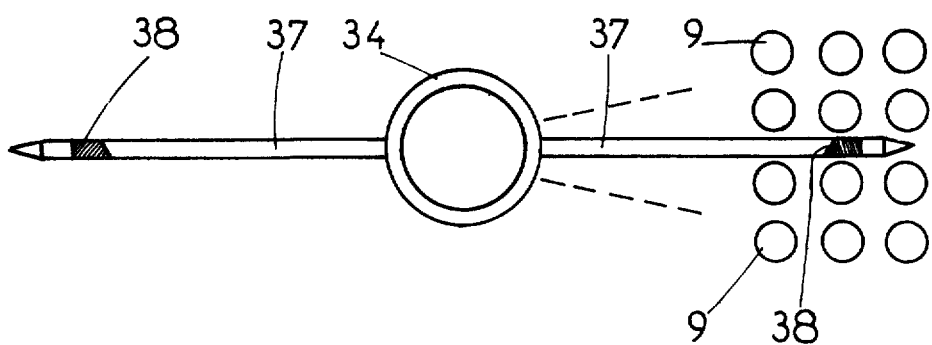
FIG. 3 is a diagrammatic view showing the penetration of an arm of the endoscope of the apparatus between the rods of a fuel assembly.

The lower plate 1 supports a rotatable plate 6 which can be positioned in one of four orientations spaced apart by 90° by means of a motor unit 7 controlled from the service platform. The plate 6 receives the square section assembly 10 of fuel rods 9 to be checked. The right-hand portion of FIG. 3 shows the regular distribution of the rods 9 in the assembly. The assembly 10 is brought onto the plate 6 by causing it to descend through an aperture 11 in the upper plate. A conventional guide device, not illustrated, permits the correct centering of the assembly in the aperture so that it comes to rest normally on the plate 6. The upper plate 2 has a recess 13 which affords passage to a carriage assembly 14 movable along vertical guide slides 15.

Figure 2:
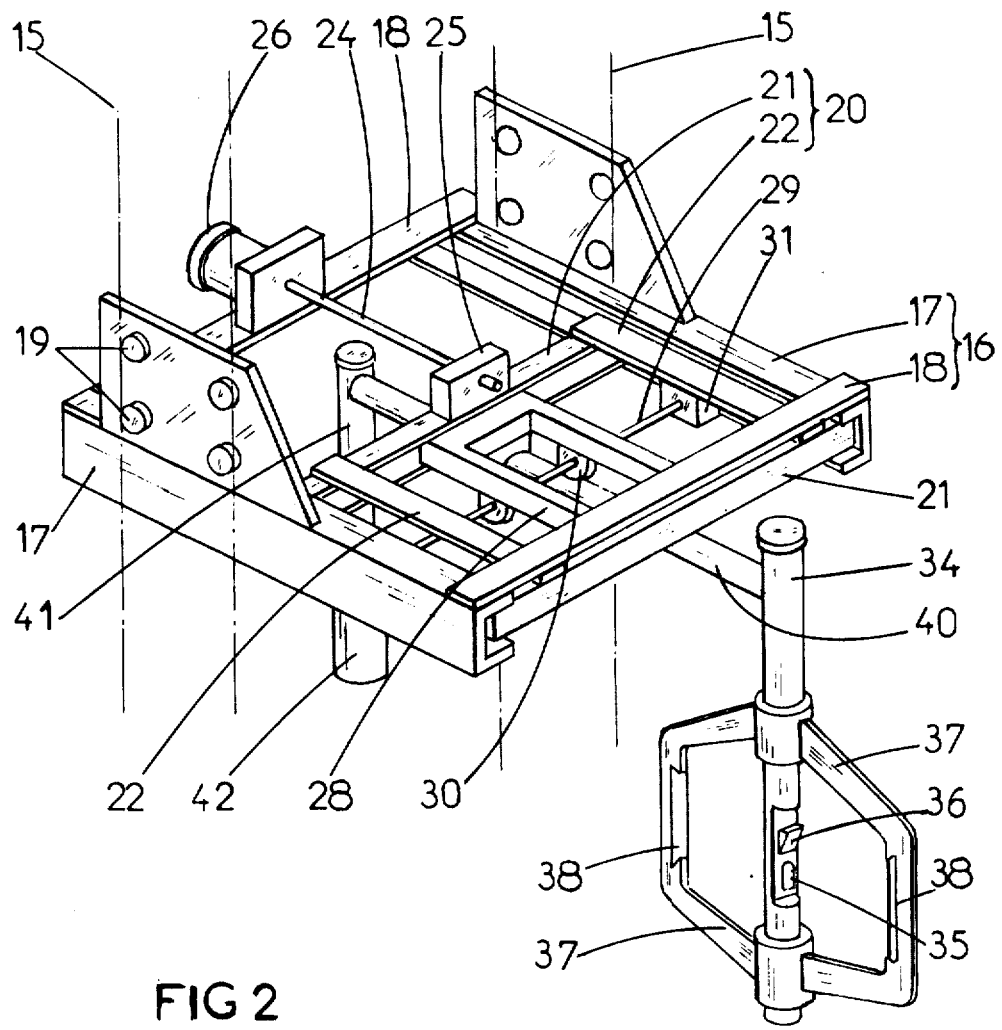
FIG. 2 is a perspective view, on a larger scale, of an apparatus according to the present invention and three carriages.

Reference will be made to FIG. 2 for the detail of the construction of the carriage assembly 14 which consists of three carriages 16, 20, 28 movable relative to one another. The first carriage 16 comprises the U-shaped slides 17 connected to one another by cross members 18 and is equipped with rollers 19 enabling it to slide in the slides 15. Inside the slides 17 there slides the second carriage 20, which also comprises U-shaped slides 21 connected by cross members 22. The movement of the carriage 20 relative to and in the carriage 16 is ensured by a screw mechanism 24 including a threaded rod engaged in a nut 25 rigidly connected to the carriage 20, and driven by a motor 26 rigidly connected to the carriage 16. Finally, the third carriage 28 consists of a frame sliding in the slides 21, that is to say perpendicular to the movement of the carriage 20 relative to the carriage 16. The movement of the carriage 28 relative to and in the carriage 20 is ensured by screw mechanism 29 including a threaded rod engaged in a nut 30 rigidly connected to the carriage 28 and driven by a motor mechanism 31 rigidly connected to the carriage 20.

To simplify the drawings, the drive mechanism ensuring the displacement of the movable assembly 14 in the slides 15 is not illustrated. This mechanism may actually be of any conventional type such as a screw system with a cable or a rack, the actual drive member being preferably disposed on the service platform.

The third carriage 28 supports an endoscope which consists of a tube 34 carrying, in the usual manner, an iodine illumination lamp 35 and a prism 36 for returning the image to the observation station. The prism and optical system of the endoscope are made of stabilized glass to withstand nuclear radiation. As shown, the endoscope is completed by two thin arms 37 forming stirrups and diametrically opposed in an axial plane of the endoscope perpendicular to the entrance plane of the prism 36. Each arm 37 carries a plane mirror 38 each forming an angle of 45° with the axial plane of the arms 37 and forming an angle of 90° between them.

The tube 34 of the endoscope is extended at 90° by a tube 40 which also serves to fix the endoscope to the carriage 28. Tube 40 is extended at 90° by a tube 41 which leads to a television camera 42. The camera 42 records the images reflected by the mirrors 38, the prism 36, and the optical devices contained in the tubes 34, 40 and 41. The images recorded by the camera 42 are retransmitted, via a flexible cable (not shown), to an observation station disposed on the service platform, and comprising, in the usual manner, a direct observation screen and possibly a magnetoscope.

It will be seen, from FIGS. 1, 2 and 3 taken together, that the arms 37 of the endoscope are adapted to penetrate into the assembly of rods 9, between the rods, and to a depth slightly greater than half the thickness of the assembly 10. The movements of the three carriages 16, 20 and 28 enable the endoscope, and in particular each of the arms 37, to be displaced in three perpendicular directions which therefore renders it possible to explore not only the rods of the assembly 10 situated on the face disposed facing the endoscope, but also the tubes disposed behind this face, and to a depth reaching half the thickness of the assembly. When half the rods have thus been examined for one direction of observation, the assembly 10 is turned through 90° by rotation of the plate 6 and a fresh series of observations can be made. It will be seen that by rotating the assembly 10 four times through 90° it is possible to observe all of the rods from different angles and thus to completely examine the whole of the surface of each rod of the assembly. The observation is further facilitated by the provision of two stirrups 37 as illustrated in the Figures. It is possible, by a remote-control which is conventional and therefore not illustrated in the Figure, to cause the assembly of double stirrups 37 to turn through 180°, which enables the orientation of the mirror reflecting images situated at the end of the arms to be changed; thus a fresh angle of observation is available for the rear portions of the rods 9.

Figure 4:
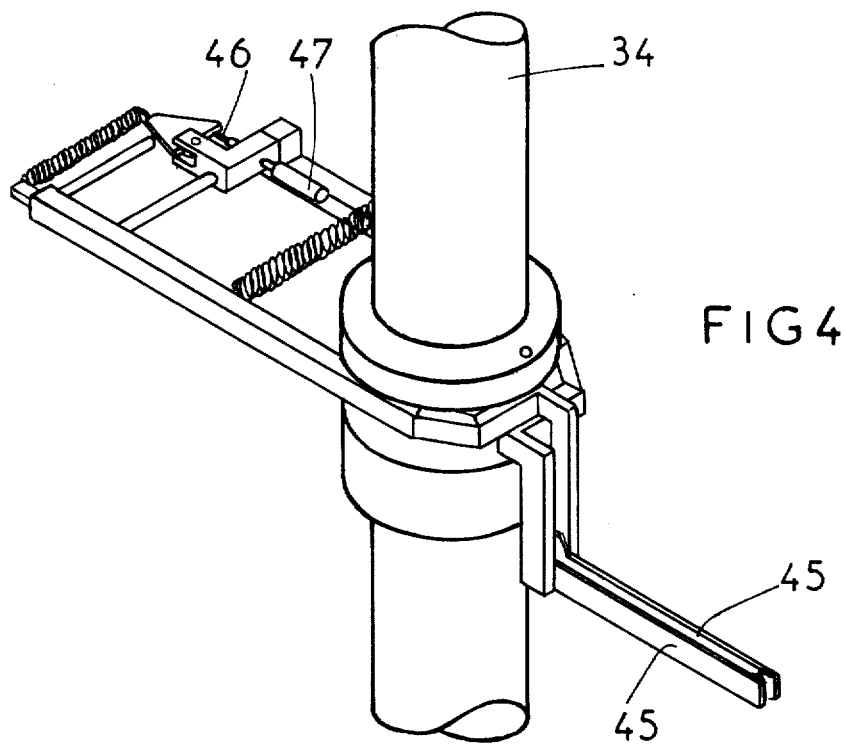
FIG. 4 is a perspective view of profilometric pincers associated with the endoscope.

Referring now to FIG. 4, a complementary device is seen which is also mounted on the tube 34 of the endoscope and consisting of a profilometric pair of pincers for the telemetric measurement step by step and/or continuously of the diameters and deviations in diameter of the fuel rods. The profilometric pincers consist of two sensing arms 45 which can be engaged either between two rods 9 to check their spacing, or one in each side of a rod to measure its diameter. All the relative angular displacements of the sensors 45 are transmitted with amplification to a rod 46 of an electromagnetic transducer or pick-off 47. The signals from the pick-off 47 are transmitted, in the usual manner via a cable (not shown) to the service platform where there is an assembly for recording these measurements.

The profilometric pincers may be disposed in one and the same plane as the arms 37 so as to take measurements at the same time as the visual observation of the surface of the rods is effected. Of course, other arrangements could be used in dependence on the particular case, for example the pincers could be used alone instead of the observation arms 37, when only a simple measurement of the diameters or the spacing is required. The sensors 45 of the profilometric pincers could alternatively be disposed at 90° relative to the arms 37 of the endoscope, the assembly then behaving like a rotary turret able to bring into action one or the other of the arms 37 and the sensors of the pincers.

The apparatus and the installation which have been described can be used with manual control, the operator himself starting the movements of the various carriages to explore a particular part of the assembly or to measure a particular portion of a rod. But the apparatuses and installation lend themselves equally well to a rapid systematic exploration with recording of the results, all the displacements of the mirror or of the profilometric pincers in the rod assembly being effected automatically, for example by means of a set of computers equipped with prerecorded displacement programs. In every case, of course, it would be necessary to complete the installation with a safety device, mounted on the mirror-carrying arms or on the profilometric pincers to stop all the displacement motors automatically in the event of abnormal contact between the apparatuses and the rods.

Of course, the invention is not intended to be limited to the details of the embodiment which has been described by way of example, but is intended to cover embodiments which only differ therefrom by details, by variants of execution or by the use of equivalent means. For example the endoscope may be equipped with only one mirror-carrying arm with one or two mirrors having different inclinations. Similarly, the plane mirrors could have other inclinations or be replaced by bevelled mirrors or concave mirrors to increase the field of vision. Finally, the television camera of the endoscope could be replaced by a device for the direct transmission of the image to the observation station, or the camera could be otherwise disposed in relation to the endoscope.

What is claimed is:

1. In an installation for use in examining the fuel rods in an assembly of fuel rods the improvement comprising:

a. an examination station adapted to be submerged including a lower plate and an upper plate fixedly spaced from said lower plate and further comprising:
  a rotatable receptacle mounted on said lower plate for receiving a vertical assembly of rods to be examined, said rotatable receptacle being positionable in at least one of four orientations;
  three movable carriages and respective means for moving said carriages, a first one of said carriages being movable on slides parallel to the rods of an assembly resting on the receptacle, a second one of said carriages being movable on horizontal slides carried by said first carriage, and a third one of said carriages being movable horizontally in a direction perpendicular to the direction of movement of said second carriage; and
  an apparatus for examining fuel rods and for permitting the visual examination of the rods of a fuel assembly immersed in the tank of a nuclear reactor or in a deactivation tank, the apparatus comprising an endoscope having a first tube of relatively large diameter, said endoscope being provided with a prism and an optical system of stabilized glass, and at least one arm supporting at least one mirror facing the prism and inclined relative to the plane defined by the axes of the tube of said endoscope and of said arm, the thickness of the arm-mirror assembly being less than the free space between the rods in the assembly to be examined, a support attached to said first tube, and a television camera attached to said support for recording images reflected by said optical system, said prism, and said mirror;
b. a service station adapted to be situated on an external platform and comprising:
  a remote-control assembly for controlling movement of said three carriages and rotation of said receptacle; and
  an observation station for observing images transmitted by said endoscope, the recorded images from said television camera being transmitted to said observation station.

2. An installation as claimed in claim 1, wherein said apparatus comprises a second arm diametrically opposite said first arm relative to said axis of said tube of said endoscope.

3. An installation as claimed in claim 1, comprising automatic control means for automatically controlling movement of said carriages and of said receptacle to cause predetermined sequences of movements of said arm of said endoscope between the rods of the assembly.

4. An installation as claimed in claim 1, comprising a safety device mounted on said arm and adapted to stop the means for the movement of said carriages in the event of contact between said arm and a rod.

5. An installation as claimed in claim 1, wherein said apparatus includes a profilometric pair of pincers having two arms forming a sensor for sensing the external diameter of a rod and means indicating the angular position of said two arms of said pincers, and said installation comprises an assembly for recording signals from said angular position indicating means.

6. An installation as claimed in claim 1 wherein said endoscope is coupled to said television camera and further comprising a visual receiver, a magneto-scope disposed at the service station, and a cable connecting said camera to said visual receiver.

7. An installation as claimed in claim 1, wherein said apparatus includes a profilometric pair of pincers having two arms forming a sensor for sensing the spacing between rods, and means indicating the angular position of said two arms of said pincers, and said installation comprises an assembly for recording signals from said angular position indicating means.

* * * * *